United States Patent [19]

Gendron et al.

[11] Patent Number: 4,597,591

[45] Date of Patent: Jul. 1, 1986

[54] ENVELOPE WITH CONCEALED MESSAGE WINDOW

[75] Inventors: Wilfred H. Gendron, Wilbraham; Frank T. Knapp, Chicopee, both of Mass.

[73] Assignee: Westvaco Corporation, New York, N.Y.

[21] Appl. No.: 617,739

[22] Filed: Jun. 6, 1984

[51] Int. Cl.[4] ........................ G09B 29/00; B42D 15/00

[52] U.S. Cl. ........................ 283/1 B; 283/100; 283/102; 283/901; 283/56; 229/71

[58] Field of Search .................... 283/1 B, 901, 72, 94, 283/100, 101, 102, 107, 111, 56; 229/71; 428/199, 202, 916, 29

[56] References Cited

U.S. PATENT DOCUMENTS

| | | | |
|---|---|---|---|
| 2,035,218 | 3/1936 | Bloom | 229/71 |
| 2,210,879 | 5/1937 | Cahoon et al. | 283/56 |
| 2,678,769 | 5/1954 | David | 283/1 B |
| 2,887,327 | 5/1959 | Tucker | 283/1 B |
| 3,181,774 | 10/1963 | Littman | 229/71 |
| 3,455,575 | 7/1969 | Seidman | 283/56 |

*Primary Examiner*—Robert L. Spruill
*Assistant Examiner*—Taylor J. Ross

[57] ABSTRACT

An envelope and blank structure is disclosed for use with promotional mailings. The envelope includes at least one window opening in its front panel which is normally covered by a sheet of transparent window material. The outer surface of the window material is in turn applied with a non-transparent coating for obscuring a message included within the envelope beneath the window opening. The message may subsequently be revealed without opening the envelope by scratching or rubbing the coating from the window material.

11 Claims, 7 Drawing Figures

ENVELOPE WITH CONCEALED MESSAGE WINDOW

BACKGROUND OF INVENTION

In the field of direct mail advertising, promotional mailings and the like, various devices and approaches have been used to entice the consumer/recipient to open the package and read the enclosed message. The devices and approaches used hereinbefore have met with varying degrees of success, but there remains a constant need to develope new and different means for attracting the attention of consumers.

One approach has been to involve the consumer/-recipient in a lottery type activity requiring the return of computer cards or post cards carrying a series of numbers or other identifying data. The computer cards or post cards are normally enclosed within an envelope which includes other advertising or promotional material. Generally the consumer/recipient cannot tell what kind of offer is being made without opening the envelope. However, in many instances, consumers conclude prior to opening the envelope that they are not interested in the promotion, and they never get to read the enclosed advertising material. Therefore, any technique that can be developed to entice the consumer/recipient of such mail to actually open the envelope is a distinct advantage.

SUMMARY OF INVENTION

The foregoing problems of prior art promotional mailing products are overcome by the present invention with the provision of a hidden message located within the envelope but which can be revealed without actually opening the envelope. The hidden message is designed to entice the consumer/recipient to continue, and open the envelope after the hidden message has been revealed.

For this purpose, the envelope disclosed herein is provided with one or more windows which are covered by a sheet of normally transparent film. At least one of these windows is obscured by applying to the outer surface thereof a coating of non-transparent material. The hidden message is positioned within the envelope so as to be located beneath the obscured window. Subsequently, when the coating material applied to the window is scraped off, the hidden message is revealed to the consumer/recipient. The hidden message is designed to entice the consumer/recipient to continue, and open the envelope and read the other enclosed material.

When more than one window is used, the non-obscured window serves as a convenient place for locating a pre-printed insert containing the name and address of the consumer/recipient. If only one window is used, the envelope may be addressed in a conventional fashion with a label or with automatic printing equipment. The hidden message may be printed on an insert placed in the envelope prior to closing, or it may be printed on one of the envelope panels in a location such that it will be located beneath the obscured window when the envelope is formed.

The type of film used to cover the window or window openings must be compatible with the coating applied thereto for obscuring the hidden message. First of all, the coating must stick to the film. Secondly, it must be capable of being rubbed off or scratched off the film by the consumer/recipient. Further, since the coating is applied to the exterior of the film material, it must be capable of withstanding the normal handling of the envelope without being inadvertently removed. Clear films such as Mylar (product of E.I. Dupont De Nemours & Company), Trycite (product of Dow Chemical Company), and acetate films produced from cellulose acetate resin have been found to be useful. However, the preferred film material is a cellulose acetate film supplied by Excel, Newark, N.J. Coating materials such as scratch-off or rub-off inks or the like may be used to obscure the message. Both water and solvent based systems have been found to be useful, but the preferred coating material is a solvent based silver coating such as Colorcon FGN 1691 or Elektromek SC-2900E, with the preferred material being Elektromek SC-2900E supplied by Elektromek Company, Carlstadt, N.J. Other film and coating materials having characteristics and performance qualities similar to the preferred materials are deemed to come within the scope of the present invention.

DETAILED DESCRIPTION

Referring more particularly to the drawings, the envelope of the present invention is formed from a single blank of material having inner and outer surfaces. The blank is divided by cut and score lines into at least one rectangular panel or front panel having additional panels foldably attached thereto which together provide an envelope pocket and a closure flap. The front panel of the envelope includes one or more window openings which are covered by a normally transparent film material. Meanwhile at least one of the windows is obscured with a non-transparent coating which is applied to the exterior surface of the window film in the region of that window.

Figure 1:
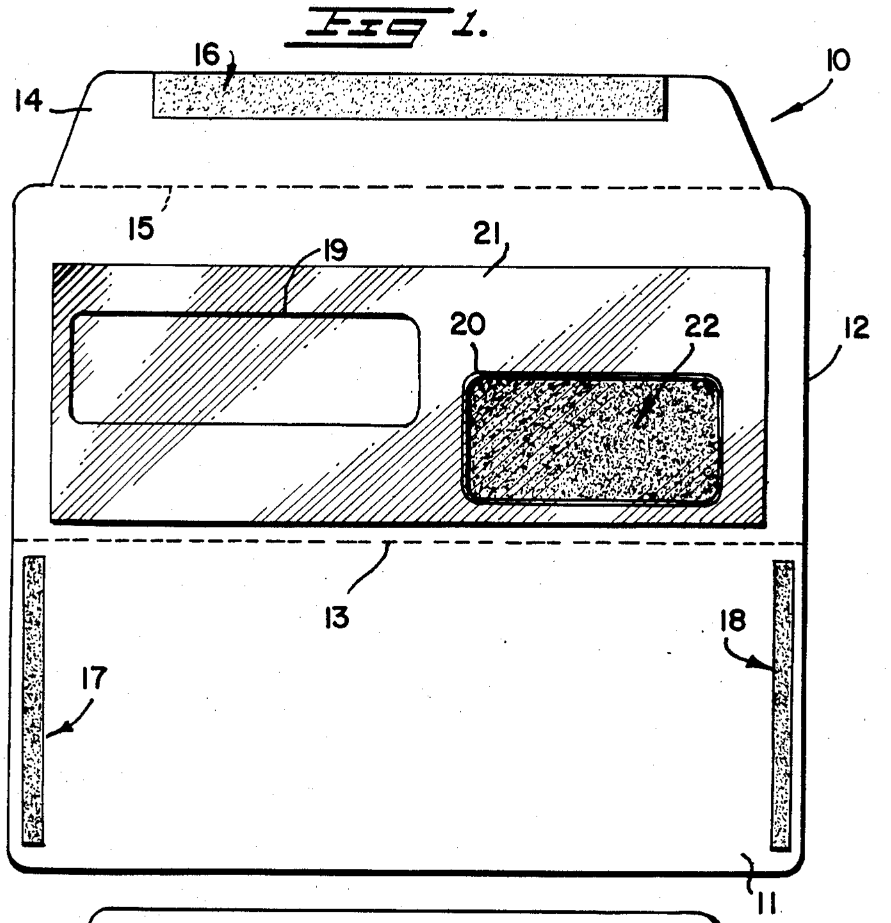
FIG. 1 is a plan view of the inside of a blank structure for forming the envelope of the present invention.
Figure 2:
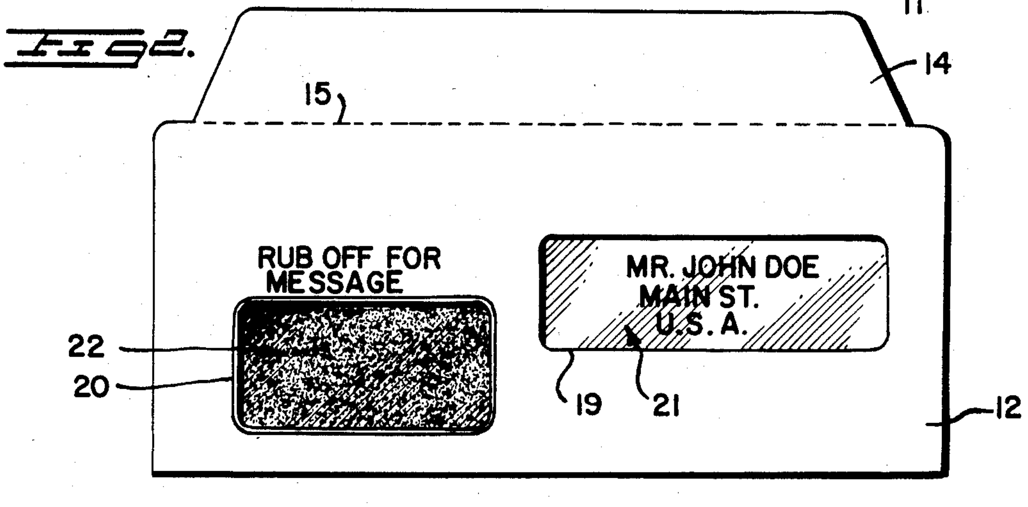
FIG. 2 is a plan view of the front of an envelope formed from the blank of FIG. 1.
Figure 3:
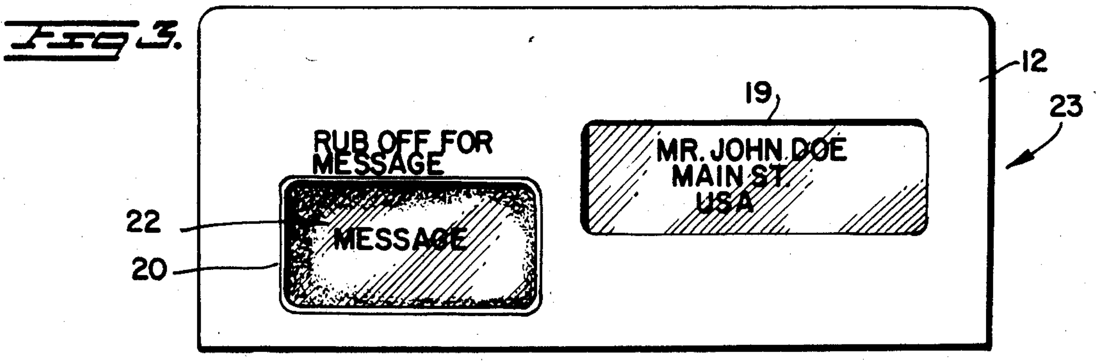
FIG. 3 is a plan view showing the sealed envelope with its hidden message revealed.

FIGS. 1–3 illustrate a first embodiment of the present invention. The blank 10 of FIG. 1 comprises a rear panel 11 and front panel 12 separated from one another by a score line 13. A closure flap 14 is foldably attached to the top of front panel 12 along a score line 15. The closure flap 14 includes a strip of adhesive 16 for closing the top of the envelope and the rear panel 11 is applied with adhesive strips 17, 18 at each side edge thereof for closing the ends of the envelope to form an envelope pocket. In the alternative, the adhesive strips 17, 18 may be applied to the edges of front panel 12 where desired, and each of the adhesive strips 16, 17 and 18 are applied to the inside surface of the envelope blank 10. The front panel 12 is illustrated as containing two window areas 19, 20 although only one window is required for the present invention. Both windows 19, 20 are covered with a sheet of transparent film material 21 which is also applied to the inside surface of blank 10. Meanwhile, at least one of the windows 20 is obscured with a non-transparent coating material 22 which is applied to the outer surface of film 21 and only in the region of the window 20.

FIG. 2 illustrates the front of the envelope formed from the blank 10 of FIG. 1. In this embodiment of the invention, an insert, as for example a pre-printed computer card, is inserted in the envelope which has printed thereon the desired message and the address of the consumer/recipient. The message is printed on the card so as to lie beneath window 20 while the pre-printed address is located beneath window 19. However, since the film at window 20 is covered with the non-transparant coating 22, the message remains hidden until the envelope is received by the addressee.

FIG. 3 illustrates the envelope 23 as received with a sufficient portion of the coating 22 rubbed off to reveal the message. Thus the consumer/recipient may read the message prior to opening the envelope. However, the message is designed to stimulate the interest of the recipient so that he or she will open the envelope 23 and read any additional material included therein.

Figure 4:
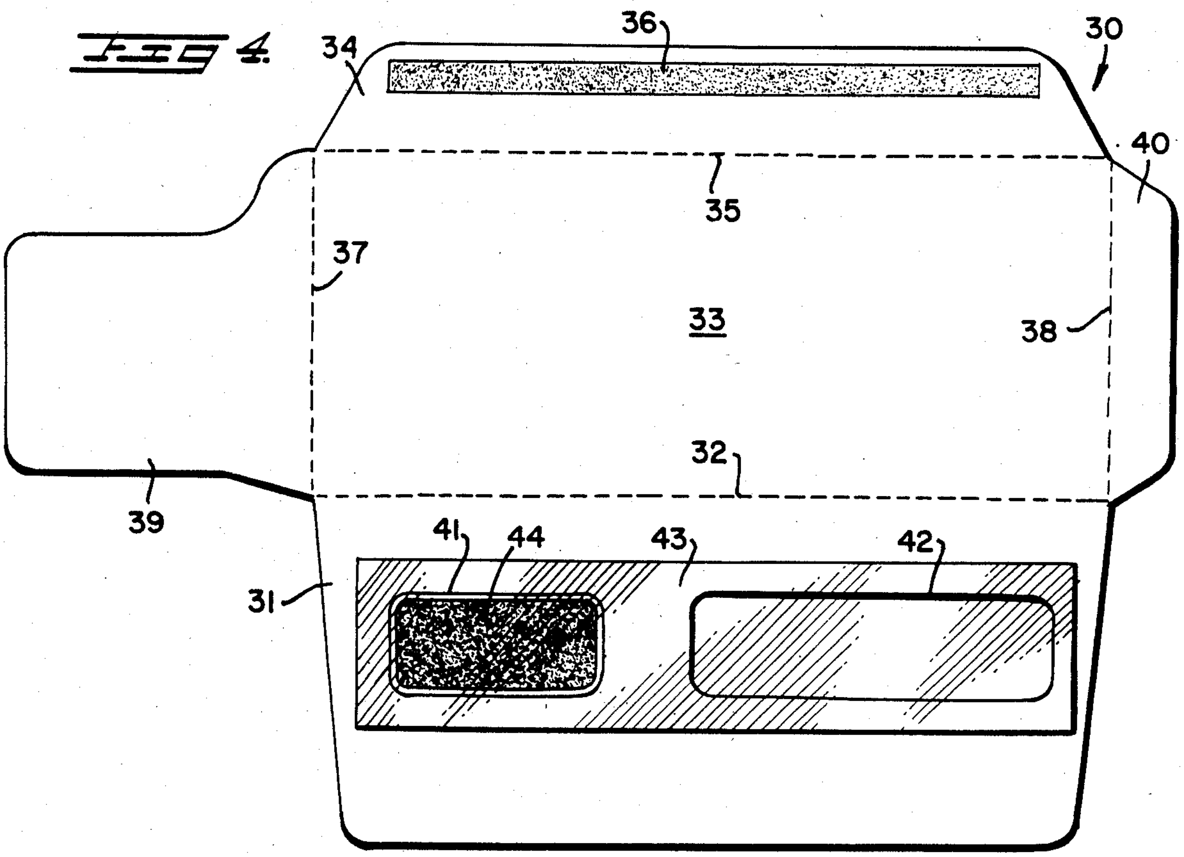
FIG. 4 is a plan view of a second embodiment of the envelope structure.

FIGS. 4–7 illustrate a second embodiment of the present invention wherein a somewhat different style of envelope is disclosed. In FIG. 4, the blank 30 comprises a rear panel 33 and front panel 31 foldably attached together along fold line 32. The rear panel 33 also includes a pair of side closure flaps 39, 40 foldably attached to the side edges thereof along score lines 37 and 38 respectively, and a closure flap 34 foldably attached to a top edge along score line 35. Side closure flap 39 is shown as being enlarged so that the intended message may be printed thereon when the envelope is printed. Meanwhile, the front panel 31 includes a pair of windows 41, 42 covered by a sheet of normally transparent film material 43. In this embodiment, the window 41 is obscured with a nontransparent coating 44 since the closure flap 39 with its pre-printed message is arranged to lie beneath window 41 when the envelope is formed.

Figure 5:
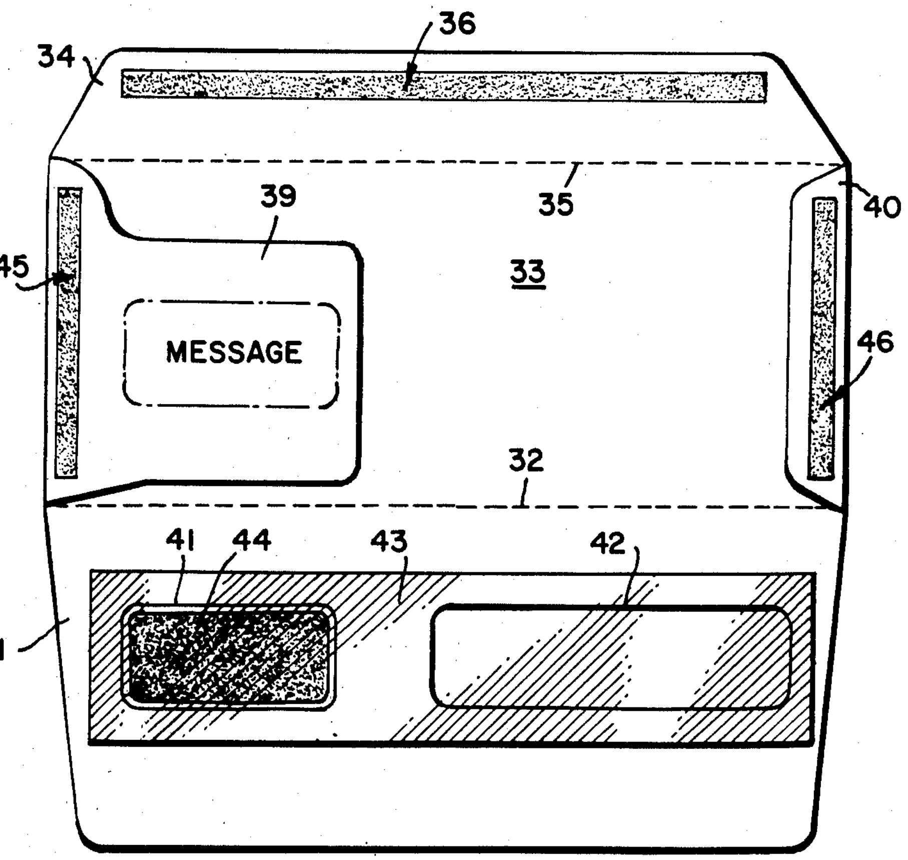
FIG. 5 is a plan view of a partially completed envelope.

FIGURE 5 shows the partially formed envelope wherein flaps 39 and 40 are folded over and applied with adhesive strips 45, 46 for closing the sides of the envelope and forming a pocket. Closure flap 34 is also applied with adhesive 36 for closing the top of the envelope. It is obvious that the adhesive strips 45, 46 could readily be applied to the rear panel 33 to achieve the same result. In addition, the film material 43 is fixed to the inside surface of blank 30 and the non-transparent coating material is applied to the outer surface of the film 43 only in the region of window 41.

Figure 6:
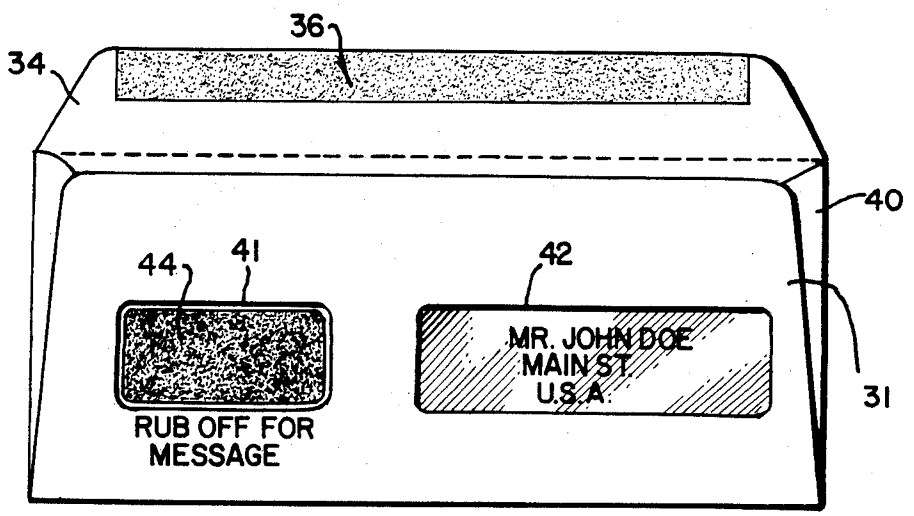
FIG. 6 is plan view of the front of the envelope of FIG. 5.

FIG. 6 illustrates the front of the envelope formed from the blank of FIG. 4 wherein window 42 provides a space for a pre-addressed insert and window 41 covers the pre-printed message applied to flap 39. In this embodiment as in the embodiment shown in FIGS. 1–4, the extra window may be omitted if an address label is used or if the envelopes are addressed on automatic printing equipment. The front panel 31 of the envelope also indicates instructions advising the addressee how to obtain access to the hidden message. Instructions such as "Rub Off For Message" or the like may be used.

Figure 7:
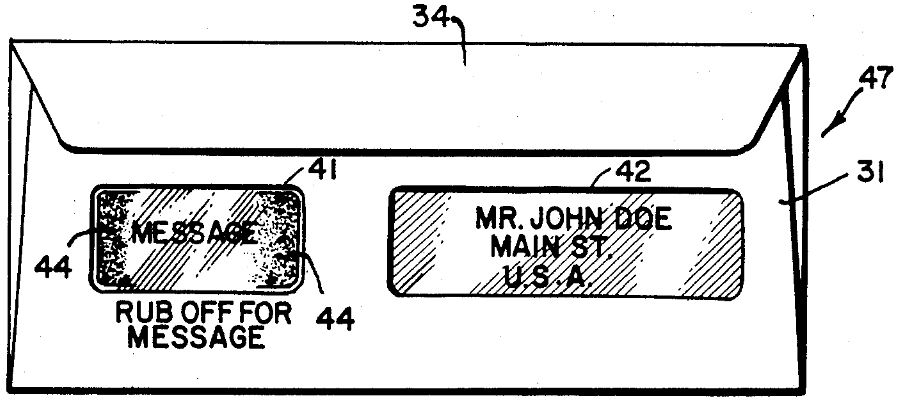
FIG. 7 is a plan view showing the envelope with its hidden message revealed.

FIG. 7 shows the envelope 47 as received by the consumer/recipient with a portion of the coating material 44 removed to reveal the hidden message. The message can thus be revealed without opening the envelope, but the message is designed to further entice the consumer/recipient to open the envelope to read the other enclosed material or to take part in the promotion being featured.

The foregoing description is intended to be illustrative of two embodiments of the present invention. Modification and changes therein may be made as desired within the scope of the following claim.

What is claimed is:

1. An envelope for use in communicating a hidden message which is revealable without opening the envelope, said envelope including at least one rectangular panel having inner and outer surfaces and additional panels which together with said rectangular panel provide an envelope pocket and closure flap, said envelope comprising:

(a) at least one window opening formed in said rectangular panel;

(b) a sheet of normally transparent window material adhered to the inner surface of said rectangular panel so as to cover said window opening;

(c) a layer of non-transparent but removable coating material applied to the outer surface of said window material in the region of said window opening so as to obscure said window; and, (d) a message located inside said envelope pocket printed on an insert or on one of said additional panels and positioned beneath said obscured window, wherein said message may be revealed without opening the envelope by removing the coating from the outer surface of said window material.

2. The envelope of claim 1 wherein the rectangular panel is provided with at least two windows each covered by normally transparent window material wherein only the window behind which the message is located is obscured by the non-transparent coating.

3. The envelope of claim 2 wherein the message is applied to an insert placed in the envelope.

4. The envelope of claim 2 wherein the message is applied to one of the additional panels of said envelope.

5. An envelope blank having an inside surface and an outside surface and consisting of a plurality of panels foldably connected together, said panels comprising at least a front panel, a rear panel and a top closure flap, at least one window opening formed in said front panel, means comprising a sheet of normally transparent window material adhered to the inside surface of said blank so as to cover said window opening, a layer of non-transparent but removable coating material applied to the outer surface of said window material in the region of said window opening so as to obscure said window, and a message printed on one of the panels of said blank other than said front panel.

6. The envelope blank of claim 5 wherein the front panel is provided with two window openings each covered by a sheet of transparent window material wherein the layer of non-transparent coating material is only applied to the outer surface of said window material in the region of one of said window openings.

7. The envelope blank of claim 6 wherein the window material comprises a strip of cellulose acetate the edges of which are adhered to the inside surface of the envelope blank.

8. The envelope blank of claim 7 wherein the non-transparent coating material comprises a solvent based rub-off ink product.

9. The envelope blank of claim 8 wherein the rear panel is foldably connected to the bottom edge of said front panel and the top closure flap is foldably connected to the top edge of said front panel.

10. The envelope blank of claim 8 wherein the front panel is foldably connected to the bottom edge of said rear panel, the top closure flap is foldably connected to the top edge of said rear panel and a pair of side closure flaps are foldably connected to the side edges of said rear panel.

11. The envelope blank of claim 10 wherein one of the side closure flaps is enlarged and the message is printed on the outer surface of said enlarged side closure flap.

* * * * *